United States Patent Office 3,594,343
Patented July 20, 1971

3,594,343
PHENOLIC-UREA HOT BOX RESIN SYSTEM
Rodney M. Huck, Longmeadow, and Joel M. Schnur, Agawam, Mass., assignors to Monsanto Company, St. Louis, Mo.
No Drawing. Filed Sept. 12, 1967, Ser. No. 667,059
Int. Cl. C08g 51/04, 51/26
U.S. Cl. 260—29.3  2 Claims

ABSTRACT OF THE DISCLOSURE

A liquid phenolic-urea resin and catalyst system which has improved bench life and low formaldehyde evolution during thermosetting. The system is especially useful in foundries for the production of sand cores at an extremely rapid rate.

BACKGROUND

Briefly, the so-called hot-box technique for producing foundry sand cores consists of coating sand typically with from about 1 to 3 weight percent of a liquid resin and catalyst system (based on total combined weight of sand and system). The so-coated sand is blown under air pressure (usually 50 to 150 p.s.i.) into core boxes maintained at about 400 to 500° F. The sand is held in a core box for only about 10 to 50 seconds, and then is removed therefrom in the form of a sand core. As removed from the box, the sand core is formed, but not fully cured; final cure takes place while the core is cooling down at room temperatures. After formation, a core is usually dipped into a so-called core-wash (which comprises a water slurry of refractory materials, such as carbon, iron oxide, graphite, etc.), and then is dried in air to improve the surface finish thereof. The resulting core is then ready for metal pouring.

A superior resin and catalyst system for use in the hot-box sand core art must have a number of properties. Thus, in order to perform most desirably such a superior system must, for example, have: (a) storage stability for each of the resin portion and the catalyst portion, respectively, before admixture together prior to use, (b) an adequate bench life, (c) a low formaldehyde evolution during curing (thermosetting), (d) a good tensile strength when cured, (e) the capacity when mixed with sand to thermoset rapidly after being heated to about 400 to 500° F. for less than a minute and then allowed to cool, and (f) the capacity to make sand cores which not only resist premature collapse after metal is cast therein but also collapse and shake out easily from cooled castings made therein.

Although phenolic-urea resin and catalyst systems have been heretofore used in the hot-box sand core art, the need for improvement in such systems is very great. All previously known phenolic-urea resin and catalyst systems evolve during the course of thermosetting (curing) a considerable amount of obnoxious and dangerous formaldehyde fumes. In addition, the ambient temperature gel times of such prior art resin and catalyst systems are generally excessively rapid for use in the hot-box technique as a consequence of which the bench life for sand coated with such systems is dangerously short. Furthermore, when such prior art resin and catalyst systems are used to make cores, the resulting cores, after a casting has been made from such, typically do not break down rapidly enough to permit easy and fast removal of sand from the cool casting.

The improvement of phenolic-urea resin and catalyst systems for hot-box usage is a very difficult problem because the multiple reactions occurring in these systems in the course of thermosetting are extremely complex. These reactions occur both simultaneously and sequentially at different respective rates with varying degrees of mutual reinforcement and with interactions. To illustrate the situation, the following equations representative of one system are given, but it will be appreciated that these equations do not entirely define the general situation, nor do they necessarily show the reactions in the sequence in which they occur in such a resin and catalyst system:

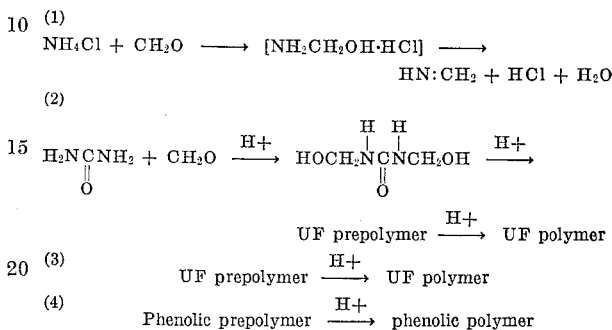

All of the curing reactions (see Equations 2, 3, and 4) are believed to be catalyzed by the HCl which is formed by the reaction of free-formaldehyde in or derived from the resin portion with ammonium chloride in or derived from the catalyst portion of the system. The rate of formation of HCl depends on the concentration of free-formaldehyde, NH$_4$Cl, and a so-called "rate constant." The "rate constant" is an indication of cure or thermoset time and is a factor which, through temperature dependent, is peculiar to a given system. Thus, at low temperatures, production of HCl should be slow, whereas at high temperatures, it should be extremely rapid.

Under mildly acidic conditions, the free urea in the system (derived mainly from the catalyst) reacts with free-formaldehyde to form mono- and di-methylol ureas, and condensation products thereof. These reactions are exothermic, and the exothermic heat stimulates the production of more HCl (see Equation 1), which further catalyzes polymerization. The polymerization is itself exothermic. The low molecular weight urea-formaldehyde polymerization products do not proceed to cure, however, until rather strong acidic conditions exist. This polymerization process is characteristically fairly rapid even at initially low temperatures due to exothermic heat and consequent HCl production.

Both the phenol-formaldehyde resin and the urea-formaldehyde resin components of the phenolic-urea resin and catalyst system cure under acid conditions. Both are fairly slow curing at low temperatures except at very low pH, but the urea-formaldehyde resin cures much more rapidly at elevated temperatures than does the phenol-formaldehyde resin. In addition, the urea-formaldehyde reaction products (see Equation 2) and the urea-formaldehyde starting resin can interact and co-condense in any number of ways. Interactions of urea-formaldehyde products, on the other hand, with the phenolic resin are possible, but not very probable. However, the free formaldehyde in the resin system reacts with both the ammonium chloride and the urea used in the catalyst (see Equations 1 and 2).

It can be seen from an analysis of the reactions represented by the above equations that the process conditions and the reaction conditions, respectively, for each of the two resins employed in this phenolic-urea resin and catalyst system can be quite different from one another. These reactions must all be controlled in order to achieve the required balance of properties in the thermoset resin of a finished core, heretofore used.

It has now been surprisingly discovered that a superior phenolic-urea resin and catalyst system adapted for use in the hot-box resin art is produced when each of the two respective resin components has certain critical characteristics and is employed in the proper concentrations together with critical amounts of uncombined formaldehyde, uncombined urea, and certain catalysts. The resulting system unexpectedly has both low formaldehyde evolution before becoming fully thermoset and long bench life (as demonstrated by gel time). These improved properties are achieved without sacrificing (a) the capacity of the resin system to cure rapidly when mixed with sand and heated to about 400 to 500° F. for less than a minute followed by cooling, (b) good tensile strength in the cured system, and (c) in said cores produced using such resin and catalyst system, either premature collapse or shake-out characteristics.

SUMMARY

This invention relates to improvements in phenolic-urea resin and catalyst compositions or systems of the class adapted to thermoset to a hard infusible resin mass upon the application of heat thereto. This class of compositions is of the type which comprise typically about 100 parts by weight of a liquid phenolic-urea resin mixture and from about 15 to 25 parts by weight of a curing catalyst therefor. The improvements to which the present invention is especially directed comprise the use of a particular resin mixture with a particular curing catalyst. The resin mixture consists essentially of an aqueous solution containing from about 50 to 80 weight percent total solids, and from about 5 to 15 weight percent free-formaldehyde dissolved therein, provided that there is always present at least 10 weight percent water in such solution. The total solids in the aqueous solution comprise, on a 100 percent dry weight basis, from about 30 to 70 weight percent of phenol-formaldehyde polymer products plus, correspondingly, from about 70 to 30 weight percent of urea-formaldehyde prepolymer products.

The phenol-formaldehyde prepolymer products are characterized by having, substantially as made (dry weight basis), both a trimethylol phenol content of from about 17 to 60, and a polynuclear phenolic content of from about 25 to 75 weight percent with, correspondingly, a mononuclear phenolic content from about 80 to 25 weight percent.

The urea-formaldehyde prepolymer products are characterized by having substantially as made a total combined nitrogen content of from about 24 to 30 percent (dry weight basis).

The curing catalyst consists essentially (on a dry weight basis) of from about 0.5 to 8 parts by weight of hexamethylenetetramine, from about 60 to 90 parts by weight of urea, and from about 10 to 20 parts by weight of an ammonium salt of a mineral acid. The relationship between said urea, said hexamethylenetetramine and said ammonium salts are such that said catalyst is at least 85 weight percent soluble in water, and has a pH at 25° C. when in a 10 weight percent aqueous solution of from about 6.0 to 8.5.

The relationship between such resin mixture and such curing catalyst is such that, when about 20 weight percent (based on total starting combined resin weight) of said catalyst is admixed with 100 parts of said resin mixture, the resulting composition is characterized by having a total formaldehyde evolution before becoming fully thermoset which is less than about 6.0 percent, and by having a gel time at a starting temperature of 20° C. under adiabatic conditions which is at least about 60 minutes.

For purposes of this invention, the free-formaldehyde content of phenolic-urea resin and catalyst composition of this invention is conveniently determined by the well-known conventional so-called hydroxylamine hydrochloride method. Total solids can be determined by the conventional Owens solids technique known to those familiar with this art.

The total phenol/formaldehyde prepolymer products present in an aqueous resin mixture is conveniently determined by conventional acetylation procedures.

The phenol/formaldehyde prepolymer products, the trimethylol phenol content, the polynuclear phenolic content, and the mononuclear phenolic content are all conveniently determined by conventional nuclear magnetic resonance techniques and by conventional gas liquid chromotography techniques using methods well known to those of ordinary skill in the art.

In the urea-formaldehyde prepolymer products, the total combined nitrogen content thereof is conveniently determined using the well-known Kjeldahl method.

For purposes of this invention, the total (free) formaldehyde evolution from a resin catalyst composition is determined using the following simulated (standardized) curing conditions:

One thousand milliliters of distilled water are placed into a 2-liter reaction flask fitted with stirrer and thermometer plus condenser and heating mantle. To the flask is added a 100 gram ± 0.1 of a sample of the resin mixture. The temperature is adjusted to about 25 to 30° C. and then there is added to the resulting mixture approximately 20 grams of catalyst. The resulting mixture is heated (with stirring) to atmospheric reflux at about 100° C. using a heating time from about 40 to 45 minutes. Thereafter, the mixture is continuously heated under conditions such that moderate boiling under reflux condenser results for 30 minutes. Thereafter the mixture is cooled down to room temperature rapidly by placing the flask in a pan of cold (about 20° C.) water. When the temperature of the mixture in the flask has dropped to the 25 to 30° range, 50 milliliters of the water phase are poured off for formaldehyde determination, disregarding the cured separated resin. Thereafter, the rest of the contents of the flask are discarded. The free-formaldehyde in this decanted liquid is determined as follows:

A 20 ± 0.1 gram sample of the water phase is weighed into an Erlenmeyer flask, then four to five drops of an indicator solution (such as bromphenolblue indicator solution) are added, and the mixture is titrated with 0.5 N·sodium hydroxide (aqueous) to the point where the sample just turns blue as shown by the indicator. Thereafter, there is added 10 ml. hydroxylamine hydrochloride solution (20 percent in water). The resulting mixture is allowed to stand for five minutes, and then is titrated with 0.5 N·sodium hydroxide (aqueous) to the same blue end point. The amount of free-formaldehyde is then calculated by the following formula:

(5) $$\text{Free formaldehyde} = \frac{\text{ml. NaOH sol's} \times 1.5}{20}$$

The free-formaldehyde in the water phase is converted to the percent evolved formaldehyde per 100 grams of starting resin and 20 grams of catalyst as follows: The free-formaldehyde value determined by Equation 1 above is multiplied by 11.2 and divided by 1.20.

Although the above procedure gives only a comparison of the evolved formaldehyde, there is a high correlation between this test and the amount of formaldehyde evolved during mixing and blowing operation using a resin catalyst composition of the invention for the manufacture of hot-box cores.

To determine the gel time for a resin mixture and catalyst system, one places a mixture of 100 grams of resin mixtures and 20 weight percent of catalyst into a wide mouthed 4 ounce jar maintained at 20° C. initially. The contents of the jar are then maintained adiabatically and observed until the system therein thermosets and is no longer manually stirrable. The time to gel (and usually the final gel temperature) are recorded.

In general, phenol-formaldehyde prepolymer products suitable for use in this invention and having the above indicated characteristics of respects their trimethylol phenol content and mononuclear and polynuclear phenolic content, can be prepared by any conventional method. It is especially convenient to react formaldehyde and phenol in the ratio of from about 1.5/1 to 3.5/1 under liquid phase conditions in the presence of an excess base catalyst at temperatures in the range of from about 55 to 75° C. until a free-formaldehyde content of not less than about 10 weight percent is achieved. The resultant mixture is then conveniently dehydrated under vacuum to achieve a desired solids (for example, ranging from 50 to 75 weight percent) content. Specific examples of particular phenol-formaldehyde resinous prepolymer products usable in this invention are illustrated by the examples given below.

In general, urea-formaldehyde prepolymer products suitable for use in the compositions of this invention and having the above-indicated nitrogen content can be prepared by any conventional methods. For example, it is convenient to react 2 or 3 mols of formaldehyde with 1 mol of urea at about 100° C. and a pH range from about 6.0 to about 7.0 (suitable adjusted conveniently by a caustic addition) under liquid aqueous conditions. The resulting resin is made preferably basic with the addition of further caustic to provide a pH in the range of from about 7.2 to 8.5, the most suitable range for this resin. Thereafter, the resulting mixture is conveniently dehydrated under vacuum to obtain a desired solids (for example, ranging from 50 to 75 weight percent) content.

To prepare phenolic-urea resin mixtures used in this invention one simply admixes such a suitable phenol/formaldehyde prepolymer product with such a suitable urea-formaldehyde prepolymer product so as to produce a resulting aqueous liquid resin mixture in which the total solids content has the respective ranges of phenol-formaldehyde prepolymer product and urea-formaldehyde prepolymer product as indicated above. Preferably, such resin mixtures can comprise from about 45 to 55 weight percent phenol-formaldehyde prepolymer product and, correspondingly, from about 55 to 45 weight percent urea-formaldehyde prepolymer products. A preferred phenolic-urea resin mixture used in this invention employ a blend weight ratio of phenol-formaldehyde prepolymer products in urea-formaldehyde prepolymer products of about 1:1. When a lower urea-formaldehyde prepolymer product content then about 30 percent is used, the resulting sand core tends to have inferior early strength, inferior cure rate, and inferior shake-out properties. On the other hand, urea-formaldehyde contents greater than 70 weight percent tend to lack some of the desired properties in a resin mixture, and to have some of the well-known disadvantages of urea-formaldehyde resins, such as lack of moisture resistance and lack of heat resistance. Furthermore, high nitrogen content in a phenolic-urea resin mixture for use in this invention can have a deleterious metallurgical side effect as respects the qualities of a casting made in a sand core using a phenolic-urea resin mixture. Therefore, it is preferred to use such resin mixtures in which the total nitrogen content of a combined resin mixture and curing catalyst system ranges from about 7 to 12 weight percent.

The admixing of phenol-formaldehyde resin with urea-formaldehyde resin can be accomplished in any desired manner. Thus, for example, it is convenient to simply charge a predetermined proportion to a convenient mixing vessel and agitate the resulting mixture to achieve a liquid blend.

In preparing suitable curing catalysts for use in the compositions of the present invention, it is generally convenient to prepare the catalyst in the form of dry powder by blending appropriate proportions of the respective ingredients (urea, hexamethylenetetramine and ammonium salts, all as indicated above) by any convenient dry blending procedure. In general, when using powders, it is preferred to employ fine particle sizes for the respective powdery components. In general, powder sizes below about 16 mesh (U.S. standard sieve) are preferred.

Examples of ammonium salts and mineral acids include ammonium nitrate, ammonium phosphate, ammonium chloride (preferred) and the like.

A preferred curing catalyst for use in this invention is in the form of dry powder having from about (dry weight basis) 10 to 25 parts by weight of ammonium chloride, from about 75 to 90 parts by weight of crystal urea, and from about 0.5 to 4 parts by weight of hexamethylenetetramine. In this preferred formulation, the particle size of the components is such that only about 1 percent at most thereof is maintained on a 20 mesh sieve (standard U.S. sieve), and about 15 weight percent maximum passes through a 200 mesh sieve. Preferably, the pH of a 10 weight percent aqueous solution falls in the range of from about 6.3 to 7.5 at 20° C.

The relationship between a resin mixture (as described above) and a catalyst (as described above) is such that when from about 10 to 30 weight percent (based on total liquid starting combined weight) of the catalyst is admixed with the resin mixture the resulting system is characterized by evolving a total amount of formaldehyde of less than about 6 percent and the gel tme under adiabatic conditions at a starting temperature of about 20° C. is at least about 60 minutes or as more specifically detailed above.

When a phenolic-urea and catalyst composition of this invention in an amount of about 2 weight percent (based on total combined weight) is admixed with sand, it is found that the resulting sand composition mixture has the capacity to thermoset rapidly after being heated to about 400 to 500° F. for less than a minute and then allowed to cool such as is done for example, in the so-called hot-box techniques for producing sand cores. Specifically, a resin and catalyst system of this invention is substantially completely cured following such a heating cycle involving the heating of a mixture of sand and resin as above described to a temperature to about 400° F. for a time of about 40 seconds followed by being placed in room temperature air and allowed to cool to room temperature.

In addition, it is found that a resin-catalyst-sand-cured composition as prepared as just above described has good tensile strength. Typical tensile strengths for these combinations generally fall in the range of from about 250 to 500 p.s.i.

In addition, it is observed that sand cores made from the resin and catalyst composition of this invention not only resist premature collapse after hot metal is cast thereinto, but also will collapse readily and shake out easily from the cooled castings made therein. The absence of premature collapse is observed visually by allowing a sand casting covered with hot metals to cool and observing the absence of collapse therein. After the casting has been allowed to cool, the shake out is used to determine in effect how easily the core can be removed after a testing operation.

When measuring strength of a core of the invention, it is convenient to measure both hot tensile strength and cold tensile strength. The hot tensile strength determines whether or not the core is firm enough to retain its shape when ejected from the core box and is handled in a foundry. The cold tensile strength represents the final strength of the cured core and determines the core's ability to withstand assembly and the weight of the metal during casting. Hot and cold tensile strengths are conveniently determined using a so-called Dietert tensile tester (a product of the H. W. Dietert Company). As the name implies, hot tensile strength is measured using a core as ejected from a core box while cold tensile strength is measured on a core which has been cooled to room temperature following ejection from the core box.

To determine shake out, one convenient procedure is to place a sample core in a preheated porcelain dish in a muffle furnace at about 1600° F. for two minutes. Thereafter, the dish is removed and a specimen is placed on a tared 20 mesh screen. The screen is then vigorously vibrated for 30 seconds. Thereafter, the screen is weighed to determine the amount of material retained thereon. This procedure is repeated using heating times in increments of 30 seconds, until the amount retained on the screen is less than 10 grams. Typical hot tensile strengths using compositions of this invention range from about 70 to 80 p.s.i.; typical cold tensile strengths range from about 275 to 400 p.s.i.; and typical shake-out times range from about 4.5 to 5.5 minutes.

EMBODIMENTS

The following examples are set forth to illustrate more clearly the principles and practice of this invention to one skilled in the art and they are not intended to be restrictive but merely to be illustrative of the invention herein contained.

Example A

A suitable phenol-formaldehyde resin for use in this invention is as follows:

To 100 parts of phenol in a reaction kettle are added first 223 parts of 50 percent formalin and then 4 parts of sodium hydroxide sufficient to bring the pH to about 8.6. The mixture is refluxed for about 3 hours at about 65° C. while maintaining a reaction pH of about 8.6. Thereafter, this mixture is cooled to about 40° C. This mixture is then neutralized to a pH of about 6.8 with aqueous diluted hydrochloric acid. The resulting mixture is dehydrated under vacuum to the desired solids level (see below). The product yield is about 220 weight percent based on starting phenol. The resin characteristics are as follows:

Total solids: 72–74%
Viscosity: 500–800 cps.
Free-formaldehyde (hydroxylamine hydrochloride method): 15–17
pH at 25° C.: 5.7–6.1
Refractive index at 25° C.: 1.5420–1.5450
Trimethylol phenol content: 45%
Polynuclear phenolic content: 25%
Mononuclear phenolic content: 75%

Example B

To 100 parts of phenol in a reaction kettle are added first 120 parts of 50 percent formalin and then 4 parts of calcium hydroxide sufficient to bring the pH to about 8.6. The mixture is refluxed for about 1 hour at 62° C. At this point, an additional 36 parts of 50% formalin are added and refluxed for 2 hours. Thereafter, the mixture is cooled to 40°. The mixture is then neutralized to a pH of 6.7 with aqueous diluted hydrochloric acid. At this point, an additional 40 parts (based on 100 parts of phenol) are added and the resulting mixture is dehydrated under vacuum to the desired solids level as indicated in Example A.

Total solids: 72–74%
Viscosity: 500–800 cps.
Free-formaldehyde (hydroxylamine hydrochloride method): 16–18
pH at 25° C.: 5.7–6.1
Refractive index at 25° C.: 1.5420–1.5450
Trimethylol phenol content: 40%
Polynuclear phenolic content: 30%
Mononuclear phenolic content: 70%

Example C

A suitable urea-formaldehyde resin for use in this invention is as follows:

In a reaction kettle is placed 200 parts by weight of 50 weight percent formalin. To the formalin is added 0.43 part by weight glacial acetic acid solution. The resulting mixture is neutralized with 33 weight percent aqueous potassium hydroxide solution, and has a pH ranging from about 6.4 to 7.0. Next to the mixture is added 100 parts by weight of crystalline urea and the mixture is heated to atmospheric reflux temperatures for about 2 hours. Thereafter, the mixture is cooled to 40° C. and neutralized with about a 33 weight percent potassium hydroxide solution to produce a product mixture having a pH of about 7.0 to 8.0. This product mixture is dehydrated under vacuum pressure to the desired solids level (see below). The yield of urea-formaldehyde resinous product is 225 weight percent (based on starting urea). This product has the following characteristics:

Total solids: 67–69%
Viscosity: 1000–2400 cps.
Free-formaldehyde (sodium sulfite method: 2.0–4.0%
pH at 25° C.: 7.2–8.2
Refractive index at 25° C.: 1.4900–1.4950
Total nitrogen content: 24–30

Example D

In a reaction kettle is placed 200 parts by weight of 50 percent formalin. To the formalin is added .55 part by weight of propionic acid. The resulting mixture is neutralized with 33 weight percent aqueous potassium hydroxide and has a pH ranging from about 6.4 to 7.0. Next, to the mixture is added 80 parts by weight of crystalline urea and the mixture is heated to atmospheric reflux for about 2 hours. Thereafter, the mixture is cooled to 60° C. and there is added to it 20 parts by weight of crystalline urea. The mixture is held thereafter at about 60° C. for about 30 minutes. Thereafter, the mixture is cooled and neutralized with a 33 weight percent potassium hydrochloride solution to produce a product mixture having a pH of about 7.0 to 8.0. This product mixture is dehydrated under vacuum in a similar manner as indicated in Example C.

Example E

A suitable curing catalyst for use with a bonding composition of the present invention is prepared as follows:

To a blender are charged about 3 parts by weight of fuller's earth and about 2 parts by weight of hexamethylenetetramine. After these materials are blended, about 80 parts by weight crystalline urea (20–200 mesh) and about 15 parts by weight of ammonium chloride (20–200 mesh) are added. Blending is continued until a homogeneous mixture is obtained.

Example F

To a blender are charged about 2 parts by weight of fuller's earth, and about 4 parts by weight of hexamethylenetetramine. After these materials are blended, about 16 parts by weight ammonium chloride and 78 parts by weight of crystalline urea are added. Blending is continued until a homogeneous mixture of finely divided solids is obtained.

Examples 1 through 7

Each of the resin prepolymer products of Examples A through D above are used to prepare resin mixtures as detailed in the following Table 1 below. Admixing in all cases is accomplished by simply pouring the indicated amount of resin into a beaker and stirring until homogeneous liquid mixture is obtained.

Thereafter each of the resin mixtures shown in Table 1 is admixed with the indicated catalyst of Example E or F to produce a phenolic-urea resin and catalyst composition of the invention. Each such composition is then tested for formaldehyde evolution and gel time by the respective test procedures earlier described. The results are tabulated in the following Table 2 below.

TABLE 1

| Example | G | H | I | J | K |
|---|---|---|---|---|---|
| Parts by weight | | | | | |
| Resin blend: | | | | | |
| Phenolic A | 70 | 50 | | | |
| Phenolic B | | | 50 | 65 | 70 |
| UF C | 30 | 50 | | 35 | |
| UF D | | | 50 | | 30 |

TABLE 2

| Example No. | Resin blend | Catalyst | Catalyst, pph. resin | Gel time (min.) | Formaldehyde evolved (percent) |
|---|---|---|---|---|---|
| 1 | G | E | 20 | >70 | 5.3 |
| 2 | H | E | 20 | 60 | <5 |
| 3 | H | F | 25 | >60 | <5 |
| 4 | I | E | 20 | >75 | <5.5 |
| 5 | I | F | 20 | 73 | <5.5 |
| 6 | J | E | 20 | >75 | <6 |
| 7 | K | E | 20 | >70 | <6 |

When each of the foregoing catalysts and resin compositions of Examples 1 through 7 is first mixed with Grand Haven sand so as to provide a mixture in which about 2 weight percent thereof is composed of a resin and catalyst system (total combined weight) and then used to prepare cores, the following tensile strengths, bench life, and shake out characteristics are observed, as recorded in Table 3 below. In this procedure, a so-called Redford core blower (as made by the Redford Company) is employed to make the cores, and the resin coated sand is blown under an air pressure of about 80 p.s.i. into core boxes maintained at about 450° F. for 40 seconds to produce standard one inch A.F.S. (American Foundry Society) tensile specimens.

TABLE 3

| Example Number | 1 | 2 | 3 | 4 | 5 | 6 | 7 |
|---|---|---|---|---|---|---|---|
| Resin blend | G | H | H | I | I | J | K |
| Percent resin (on sand) | 2 | 2 | 2 | 2 | 2 | 2 | 2 |
| Catalyst | E | E | F | E | F | E | E |
| Percent catalyst (on resin) | 20 | 20 | 25 | 20 | 20 | 20 | 20 |
| Hot tensile (p.s.i.) | 68 | 75 | 70 | 73 | 75 | 65 | 70 |
| Cold tensile (p.s.i.) | 280 | 300 | 290 | 320 | 285 | 300 | 290 |
| Bench life at 95° F. (min.) | 105 | 90 | 105 | 105 | 120 | 90 | 105 |
| Shake-out time (min.) | 6 | 5 | 4.5 | 5.5 | 5.5 | 5.5 | 6 |

What is claimed is:

1. In a phenolic-urea resin and catalyst composition adapted to thermoset to a hard, infusible resin mass upon the application of heat thereto, said composition comprising 100 parts by weight of a liquid phenolic-urea resin mixture, and, correspondingly, from about 15 to 25 parts by weight of a curing catalyst therefor; the improvement which consisting essentially of:

(1) a resin mixture which consists essentially of:
(a) an aqueous solution containing from about 50 to 80 weight percent total solids, and from about 5 to 15 weight percent free-formaldehyde, provided at least 10 percent water is present.
(b) said total solids comprising on a 100 percent dry weight basis from about 30 to 70 weight percent of phenol-formaldehyde prepolymer products, plus, correspondingly, from about 70 to 30 weight percent of urea-formaldehyde prepolymer products,
(c) said phenol-formaldehyde prepolymer products being characterized by having substantially as made (dry weight basis) both a trimethylol phenol content of from about 17 to 60 weight percent, and a polynuclear phenolic content of from about 20 to 75 weight percent, with, correspondingly, a mononuclear phenolic content of from about 80 to 25 weight percent,
(d) said urea-formaldehyde prepolymer products being characterized by having substantially as made a total combined nitrogen content of from about 24 to 30 weight percent (dry weight basis), (2) a curing catalyst which:
(a') chemically consists essentially of (dry weight basis) from about 0.5–8 parts by weight of hexamethylenetetramine, from about 60 to 90 parts by weight of urea, and from about 10 to 20 parts by weight of an ammonium salt of a mineral acid,
(b') the relationship between said urea, said hexamethylenetetramine, and said ammonium salt being such that said catalyst is at least 85 weight percent soluble in water, and has a pH at 25° C., ranging from about 6.0 to 8.5 in a 10 weight percent aqueous solution, and (3) the relationship between said resin mixture and said curing catalyst being such that, when about 20 weight percent (based on total starting combined resin weight) of said catalyst is admixed with 100 parts of said resin mixture, the resulting composition is characterized by having:
(a") a total formaldehyde evolution before becoming fully thermoset which is less than about 6.0 percent,
(b") a gel time at a starting temperature of 20° C. under adiabatic conditions which is at least about 60 minutes.

2. A composition suitable for the manufacture of foundry sand cores comprising in combination a homogeneous mixture of from about 1 to 3 weight percent of a resin composition in claim 1 and the balance up to 100 weight percent comprising sand.

References Cited

UNITED STATES PATENTS

| 2,162,331 | 6/1939 | Ellis | 260—29.3 |
| 3,076,772 | 2/1963 | Christ | 260—29.3 |
| 3,306,864 | 2/1967 | Lang et al. | 260—38 |
| 3,404,198 | 10/1968 | Guyer | 260—29.3 |

DONALD J. ARNOLD, Primary Examiner

U.S. Cl. X.R.

260—38, 39, 840

PO-1050
(5/69)

UNITED STATES PATENT OFFICE
CERTIFICATE OF CORRECTION

Patent No. 3,594,343      Dated July 20, 1971

Inventor(s) Rodney M. Huck and Joel M. Schnur

It is certified that error appears in the above-identified patent and that said Letters Patent are hereby corrected as shown below:

Column 4, line 63, after the expression "resin" insert - - - and - - -.

Column 4, line 68, "mixtures" should read - - - mixture - - -.

Column 7, line 75, "part" should read - - - parts - - -.

Column 8, line 41, "bonding" should read - - - binding - - -.

Signed and sealed this 15th day of February 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,594,343          Dated July 20, 1971

Inventor(s) Rodney M. Huck, et al

It is certified that error appears in the above-identified patent and that said Letters Patent are hereby corrected as shown below:

Column 9, line 51, after "of" should read -- , in combination --.

Signed and sealed this 17th day of October 1972.

(SEAL)
Attest:

EDWARD M. FLETCHER, JR.           ROBERT GOTTSCHALK
Attesting Officer                 Commissioner of Patents